(12) United States Patent
Smith et al.

(10) Patent No.: US 11,741,224 B2
(45) Date of Patent: Aug. 29, 2023

(54) ATTESTATION WITH A QUANTIFIED TRUSTED COMPUTING BASE

(71) Applicant: Intel Corporation, Santa Clara, CA (US)

(72) Inventors: Ned M. Smith, Beaverton, OR (US); Daniel Middleton, Orono, MN (US)

(73) Assignee: INTEL CORPORATION, Santa Clara, CA (US)

( * ) Notice: Subject to any disclaimer, the term of this patent is extended or adjusted under 35 U.S.C. 154(b) by 143 days.

(21) Appl. No.: 17/479,893

(22) Filed: Sep. 20, 2021

(65) Prior Publication Data
US 2022/0004627 A1    Jan. 6, 2022

(51) Int. Cl.
*G06F 21/57* (2013.01)
*G06F 21/54* (2013.01)
*G06F 21/55* (2013.01)

(52) U.S. Cl.
CPC ............ *G06F 21/54* (2013.01); *G06F 21/554* (2013.01); *G06F 21/572* (2013.01)

(58) Field of Classification Search
CPC ........ G06F 21/54; G06F 21/554; G06F 21/57; G06F 21/572; G06F 21/64
See application file for complete search history.

(56) References Cited

U.S. PATENT DOCUMENTS

| 2017/0295195 | A1* | 10/2017 | Wettstein | H04L 63/1425 |
| 2020/0193065 | A1* | 6/2020 | Smith | H04L 9/3242 |
| 2020/0313911 | A1* | 10/2020 | Mondello | H04L 9/3268 |
| 2022/0405391 | A1* | 12/2022 | Liu | G06F 21/572 |

OTHER PUBLICATIONS

Trusted Computing Group (TCG), "Hardware Requirements for a Device Identifier Composition Engine", Family "2.0", Level 00, Revision 78, Mar. 22, 2018, 12 pages. (Year: 2018).*
M. Xu et al., "Dominance as a New Trusted Computing Primitive for the Internet of Things," 2019 IEEE Symposium on Security and Privacy (SP), San Francisco, CA, USA, 2019, pp. 1415-1430, doi: 10.1109/SP.2019.00084. (Year: 2019).*
Intel Trust Domain Extensions (Intel TDX), White Paper, 2020, 9 pages.

(Continued)

*Primary Examiner* — Michael Simitoski
(74) *Attorney, Agent, or Firm* — Jaffery Watson Mendonsa & Hamilton LLP

(57) ABSTRACT

An apparatus and method include generating a trusted computing base (TCB) component identifier (TCI) of a current component of a computing system, generating a compound device identifier (ID) (CDI) of the current component from a CDI of a previous component of the computing system and the TCI of the current component, and determining a size of the TCI of the current component. The system and method further include summing the size of the TCI of the current component and the cumulative size of the TCIs of previous components of the computing system to generate a current cumulative size, combining the current cumulative size and the CDI of the current component, and including the combined current cumulative size and the CDI of the current component in a chain of measurements for attestation of the computing system.

20 Claims, 15 Drawing Sheets

(56) References Cited

OTHER PUBLICATIONS

Tran, Thuc, "Software Complexity Model", NDIA Systems Engineering Conference 2017, 22 pages.
Trusted Computing Group (TCG), "Dice Attestation Architecture", Version 1.00, Revision 0.23, Mar. 1, 2021, 36 pages.
Trusted Computing Group (TCG), "Dice Layering Architecture", Version 1.0, Revision 0.19, Mar. 9, 2020, 31 pages.
Trusted Computing Group (TCG), "Symmetric Identity Based Device Attestation", Version 1.0, Revision 0.95, Jan. 7, 2020, 15 pages.
Trusted Computing Group (TCG), "Trusted Platform Architecture Hardware Requirements for a Device Identifier Composition Engine", Committee Draft, Family "2.0", Level 00, Revision 69, Dec. 16, 2016, 11 pages.

\* cited by examiner

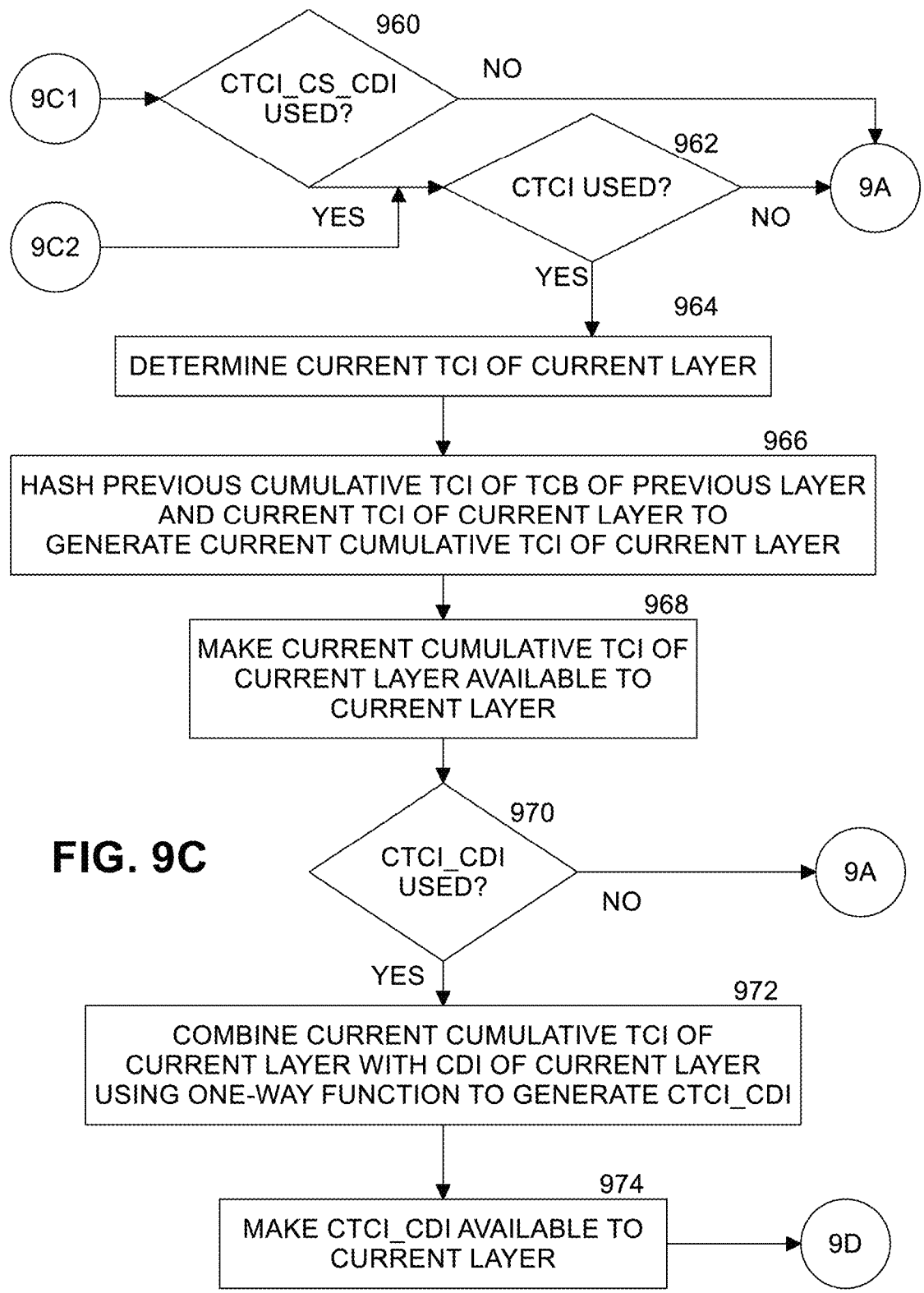

ATTESTATION WITH A QUANTIFIED TRUSTED COMPUTING BASE

FIELD

Embodiments relate generally to computer security, and more particularly, to protecting a computing system through attestation of a quantified trusted computing base.

BACKGROUND

The security of a computing environment tends to vary inversely with its size; it is easier to secure smaller computing environments. Attestations are used to assert the security state of a computing environment. Generally, attestation specifications define measuring a component of a computing environment by hashing code in memory and then signing that measurement. Attestation formats are defined in various vendor products, such as Software Guard Extensions (SGX), available from Intel Corporation. They are also described in standards such as the Trusted Computing Group (TCG) Trusted Platform Module (TPM) and Device Identifier Composition Engine (DICE) specifications.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

FIGS. 9A, 9B, 9C, and 9D are flow diagrams of measurement generation according to some embodiments.

DETAILED DESCRIPTION

The technology described herein quantifies and communicates the size of a secure computing environment, such as a trusted computing base (TCB) within a computing system, through attestation. The number of bytes being measured for components of the TCB is known at the time that the measurements of the TCB components are produced. An embodiment provides a summation of the number of bytes of binary code measured for components of the TCB and provides that quantity as an additional parameter for the attestation process. Embodiments are designed to be compatible with existing standards.

Figure 1:
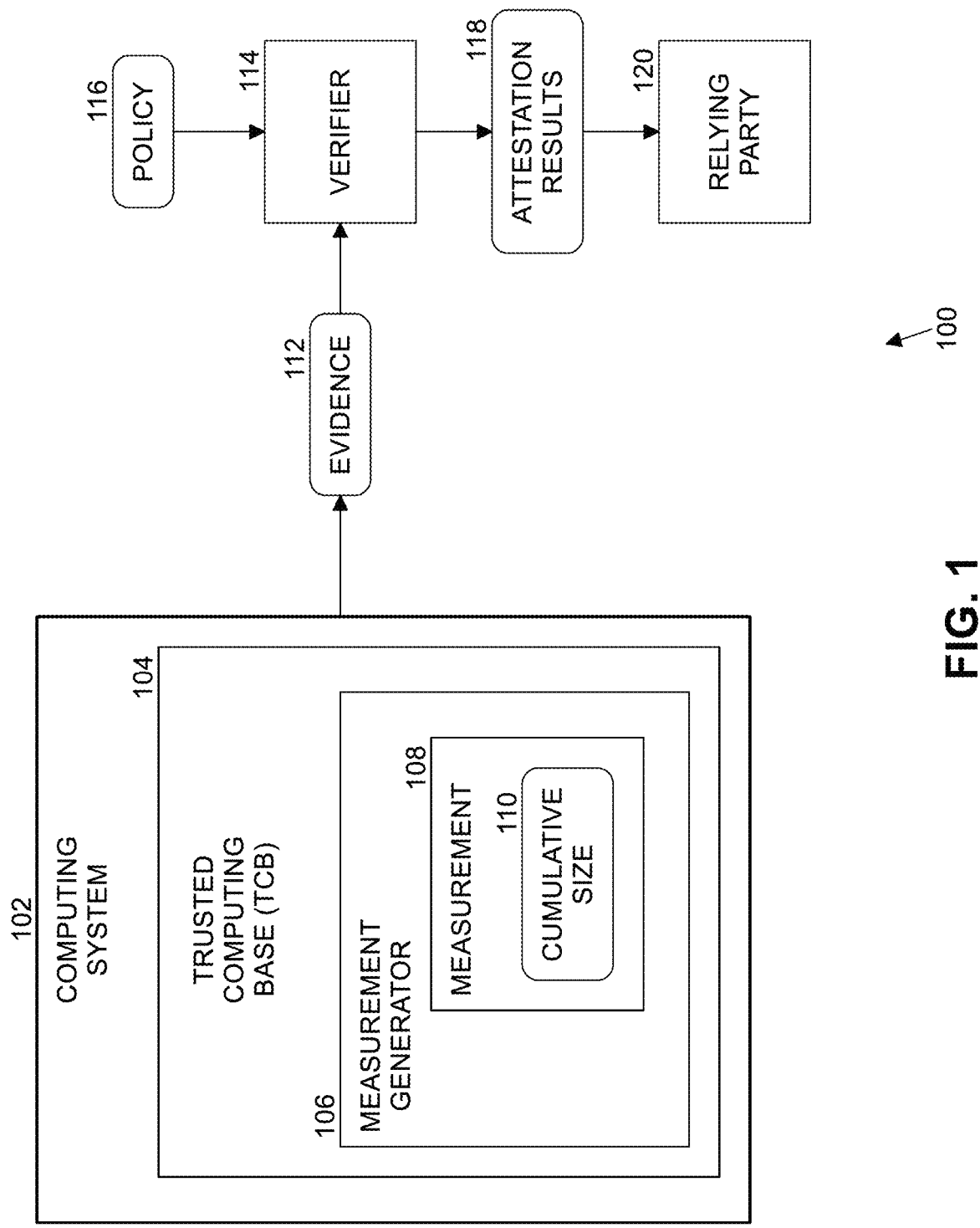
FIG. 1 is a diagram of a computing arrangement supporting attestation according to some embodiments.

FIG. 1 is a diagram of a computing arrangement 100 supporting attestation according to some embodiments. Computing system 102 includes a trusted computing base (TCB) 104. TCB 104 is a set of hardware, firmware, and/or software components that may be used to provide security to computing system 102, in the sense that bugs or vulnerabilities occurring inside the TCB might jeopardize the security properties of the entire computing system.

Authentication via attestation is a known method to validate the legitimacy of one or more components in computing system 102 that requires strict enforcement of a proof of identity. In an attestation model, a verifier 114 sends a challenge to the attestor (e.g., TCB 104 of computing system 102) and receives a certificate chain, or collection of certificates, from the attestor in response. The attestor calculates the response with a unique cryptographic secret (usually derived by a private key or an alias key) and then sends the response (e.g., evidence 112) back to verifier 114.

Attestation verification is widely used in trusted computing environments to establish the credibility and believability of the attesting environment. For example, Intel® SGX, the Security Protocol and Data Model (SPDM) by the Distributed Management Task Force (DMTF), the Device Identity Composition Engine (DICE) by the Trusted Computing Group (TCG), and Trusted Platform Module (TPM) technology, each implement attestation mechanisms.

In an embodiment, TCB 104 includes measurement generator 106 to generate one or more measurements 108 of one or more components of the TCB and/or computing system 102. Measurements 108 may be included in evidence 112 sent to verifier 114. Verifier 114 analyzes the evidence 112 in relation to a policy 116 and generates attestation results 118. The attestation results may be sent to a relying party 120. Relying party 120 may then determine if TCB 104 is to be trusted.

In an embodiment, a cumulative size 110 of two or more of the components of TCB 104 are included in measurement 108. Implementers of security technologies in computing systems make design choices that impact the size of the TCB. In one embodiment, the cumulative size of the TCB may be used as a quality metric by the owner of the computing system to calculate a security risk of the TCB. Further, the size of the TCB may be used as a portion of evidence 112 for verifying the trust of the TCB during attestation processing. This size may be communicated to relying party 120 as part of the attestation results 118.

At least one embodiment may be implemented as an extension to the TCG DICE Attestation Architecture specification version 1.00, revision 0.23, Mar. 1, 2021, and later versions, and the DICE Layering Architecture specification, version 1.0, revision 0.19, Jul. 23, 2020, and later versions. These specifications define a chain of measurements, with each subsequent measurement cryptographically bound to the previous measurement through a one-way function (e.g., a secure hash function). In an embodiment, the number of bytes of a component of the TCB is input to the hash function and accumulated.

More specifically, in an embodiment, a Compound Device Identifier (CDI) of a component in the DICE Layering Architecture is a function of the CDI of an immediate predecessor component's CDI and the component's own mutable code. An embodiment records the size of the mutable code and passes the code size to the next stage in the chain of measurements. A CDI is a set of data used to identify the software running on a computing system that was used to generate the data. A CDI is an ID of an instance of a component with entropy and may be used to identify a device. A device may be a component implemented in software, firmware or hardware. Except when specifically referring to CDI, each element of computing system 102 that is measured and included in the attestation process is referred to herein as a component rather than a device. In the DICE Layering Architecture, $CDI_n$=hash $(CDI_{n-1} || mutable\_code_n)$, where n is an index of a layer (e.g., an element of a DICE architecture). In an embodiment, a current (cumulative) CDI is generated in the same manner, and the sizes of the components in each layer are accumulated as $\Sigma_{i=0}^{n} size(mutable\_code_i)$.

In another embodiment, a TCB Component Identifier (TCI) is a measurement of a component of a TCB. An example of a TCI is a digest of component firmware or software. A TCI may operate as a class identifier and identify a class of devices. In an embodiment, a TCI of a component in the DICE Layering Architecture is a function of the TCI of an immediate predecessor component's TCI and the component's own mutable code. An embodiment records the size of the mutable code and passes the code size to the next stage in the chain of measurements. In the DICE Layering Architecture, $TCI_n$=hash $(TCI_{n-1} || mutable\_code_n)$, where n is an index of a layer (e.g., an element of a DICE architecture). In an embodiment, a current (cumulative) TCI is generated in the same manner, and the sizes of the components in each layer are accumulated as $\Sigma_{i=0}^{n} size(mutable\_code_i)$.

Figure 2:
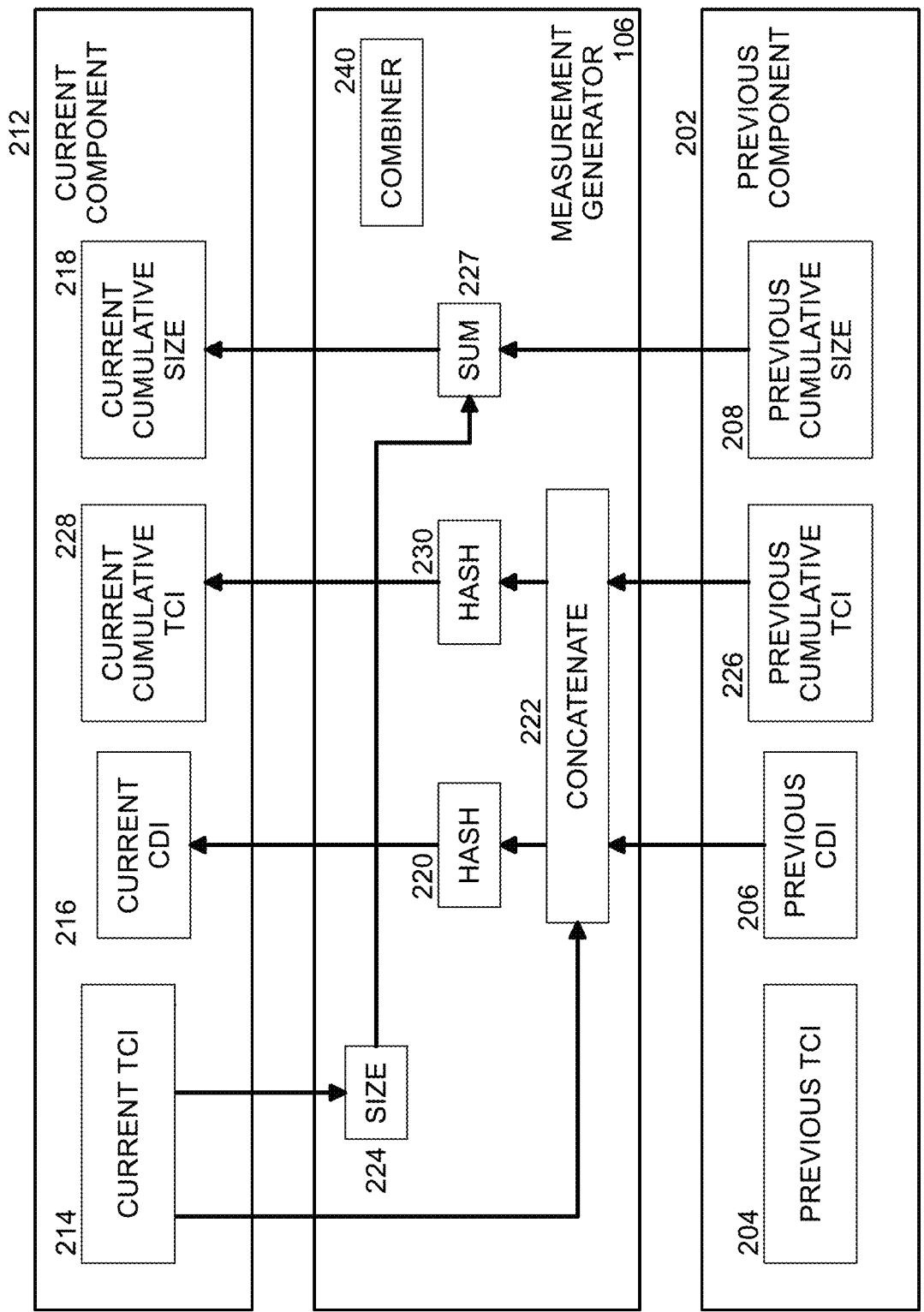
FIG. 2 is a diagram of a measurement generator interacting with a previous component and a current component according to some embodiments.

FIG. 2 is a diagram 200 of a measurement generator 106 interacting with a previous component 202 and a current component 212 according to some embodiments. Previous component 202 and current component 212 are two components of TCB 104 in computing system 102. In an embodiment, previous component is part of a previous layer of TCB 104 and current component is part of a current layer of TCB 104. Previous component 202 includes previous TCI 204. In an embodiment, previous TCI 204 is in binary form and the size of the previous TCI can be measured in terms of a number of bytes. Previous component 202 includes previous CDI 206 (e.g., cumulatively generated according to $CDI_n$=hash $(CDI_{n-1} || mutable\_code_n)$), previous cumulative TCI 226 (e.g., cumulatively generated as $TCI_n$=hash $(TCI_{n-1} || mutable\_code_n)$) and previous cumulative size 208 (e.g., generated according to $\Sigma_{i=0}^{n} size(mutable\_code_i)$). In another embodiment, the cumulative size may also include the size of one or more of settings, initialization vectors, and data. In another embodiment, previous CDI 206, previous cumulative TCI 226 and/or previous cumulative size 208 are integral with or stored in measurement generator 106 or other locations in TCB 104. Current component 212 includes current TCI 214. In an embodiment, current TCI 214 is in binary form and the size of the current TCI can be measured in terms of a number of bytes. Current component 212 includes current CDI 216 (e.g., cumulatively generated according to $CDI_n$=hash $(CDI_{n-1} || mutable\_code_n)$), current cumulative TCI 228 (e.g., cumulatively generated as $TCI_n$=hash $(TCI_{n-1} || mutable\_code_n)$), and current cumulative size 218 (e.g., generated according to $\Sigma_{i=0}^{n} size(mutable\_code_i)$). In another embodiment, current CDI 216, current cumulative TCI 228 and/or current cumulative size 218 are integral with or stored in measurement generator 106 or other locations in TCB 104.

Measurement generator 106 includes concatenate function 222 to take as input previous CDI 206 and current TCI 214 and generate a first concatenation result, and previous cumulative TCI 226 and current TCI 214 to generate a second concatenation result. The first concatenation result is input to hash function 220 of measurement generator 106. Hash function 220 applies a cryptographic hash to the first concatenation result to produce current CDI 216. Hash function 220 may also be referred to as a "one way function" (OWF) herein. The second concatenation result is in to hash function 230 to produce current cumulative TCI 228. Measurement generator 106 includes size function 224 to determine the size of current TCI 214. Measurement generator 106 includes sum function 227 to take as input previous cumulative size 208 and the size of the current TCI 214 and generate current cumulative size 218.

In an embodiment, hash function 220 (to generate current CDI 216) and hash function 230 (to generate current TCI 228) perform the same function. In another embodiment, hash function 220 and hash function 230 perform different functions.

In an embodiment, measurement generator 106 includes combiner 240 to combine one or more of previous CDI 206, current CDI 216, previous cumulative TCI 226, current cumulative TCI 228, previous cumulative size 208, and current cumulative size 218 for purposes of attestation of TCB 104, as described further below.

In other embodiments, measurement generator 106 generates measurements of one or more components in TCB 104 other than cumulative size 110 (e.g., current cumulative size 218).

Figure 3A:
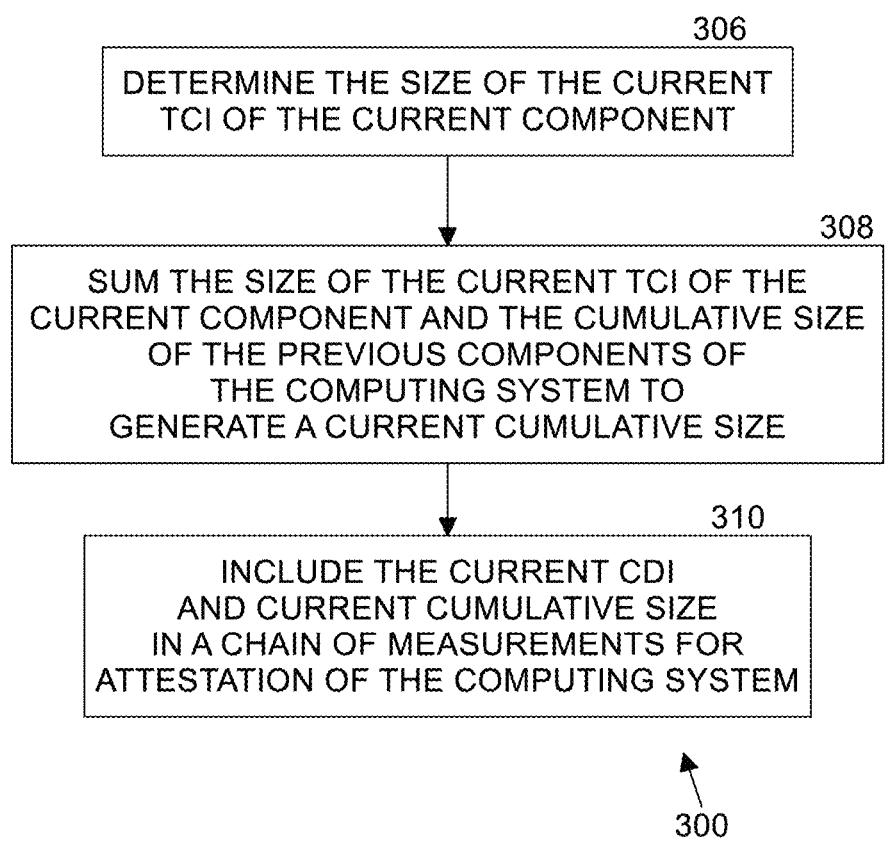
FIGS. 3A and 3B are flow diagrams of measurement generator processing according to some embodiments.
Figure 3B:
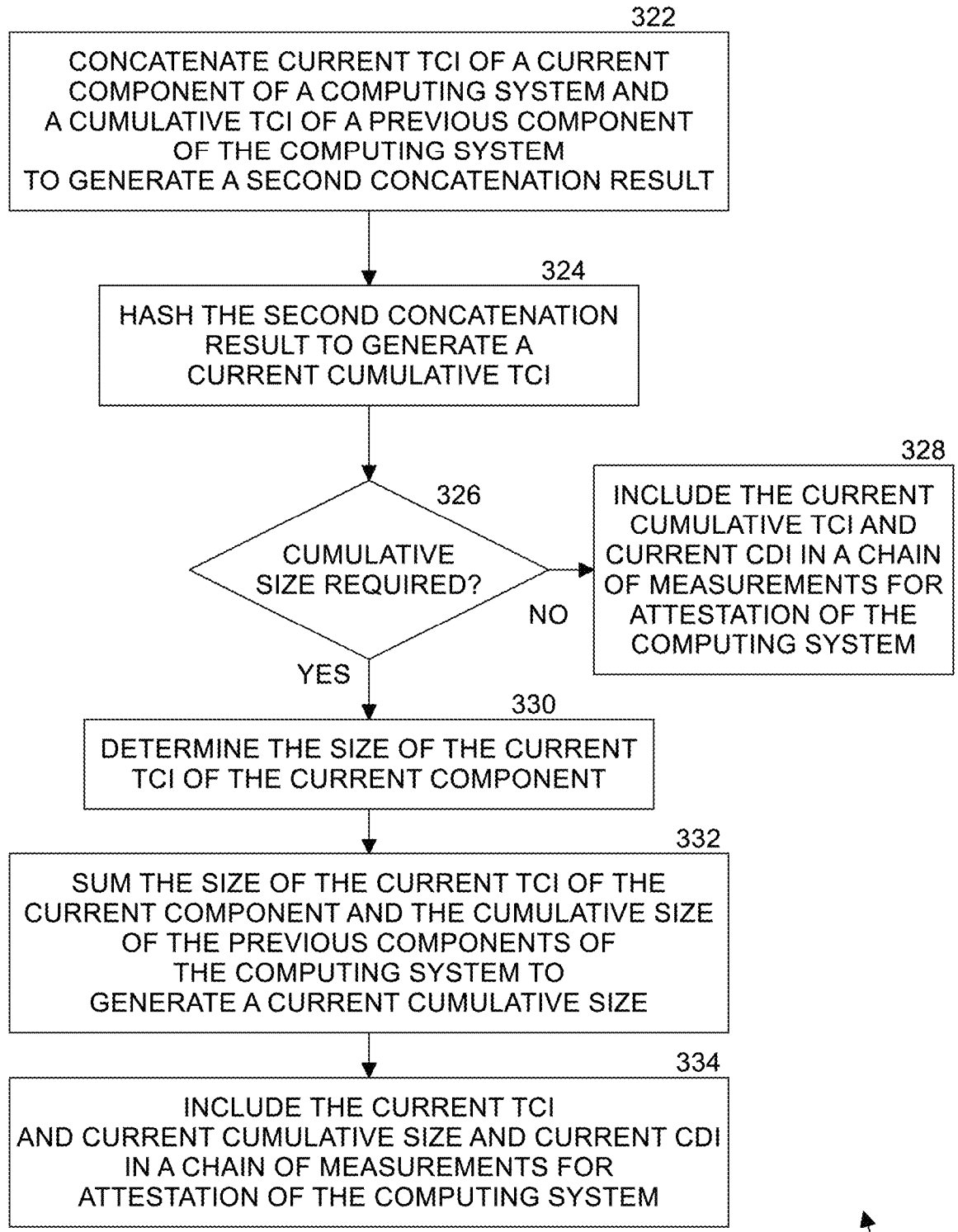

FIGS. 3A and 3B are flow diagrams of measurement generator processing 300 according to some embodiments. FIG. 3A describes measurement processing for a cumulative size (CS). At block 306, measurement generator 106 determinees the size of current TCI 214 of the current component 212. At block 308, measurement generator 106 sums the size of the current TCI 214 of the current component 212 and the previous cumulative size 208 of the previous component(s) 202 of the computing system to generate a current cumulative size 218. At block 310, measurement generator 106 includes current CDI 216 and current cumulative size 218 (e.g., cumulative size 110) in a chain of measurements (e.g., evidence 112) for attestation of TCB 104 of computing system 102.

FIG. 3B describes measurement processing for a TCI. At block 322, measurement generator 106 concatenates current TCI 214 of current component 212 of computing system 102 and previous cumulative TCI 226 of previous component 202 of computing system 102 to generate a second concatenation result. At block 324, measurement generator 106 hashes the second concatenation result to generate current cumulative TCI 228. At block 326, if cumulative size is not required for attestation purposes, then at block 328 the current cumulative TCI 228 and the current CDI 216 are included in a chain of measurements for attestation of the computing system.

At block 326, if the cumulative size is required for attestation purposes, then at block 330 measurement generator 106 determines a size of current TCI 214 of the current component 212. At block 332, measurement generator 106 sums the size of the current TCI 214 of the current component 212 and the previous cumulative size 208 of the previous component(s) 202 of the computing system to generate a current cumulative size 218. In an embodiment, blocks 330 and 332 may be omitted if already performed for the current component in blocks 306 and 308 of FIG. 3A. At block 334, measurement generator 106 includes current cumulative TCI 228 and current cumulative size 218 (e.g., cumulative size 110) and current CDI 216 in a chain of measurements (e.g., evidence 112) for attestation of TCB 104 of computing system 102.

In an embodiment, the actions of FIG. 3A are performed. In another embodiment, the actions of FIG. 3B are performed. In a further embodiment, the actions of FIG. 3A and FIG. 3B are performed.

In order to be compatible with the DICE standards described above, embodiments do not insert the current cumulative size 218 as a parameter for the measurement of the current CDI 216, such that the measurement of the component changes. However, in other embodiments, that may be implemented as, for example, $CS\_CDI_n$=hash $(CDI_{n-1})||mutable\_code_n||size (mutable\_code_n)$. That is, the current cumulative size 218 could be included in the generation of the current CDI 218 (as shown below as CS_CDI 806 of FIG. 8).

In some cases, computing system 102 may not have mutable firmware. In this case, the DICE Layering Architecture calls for hashing a vendor defined class identifier. This class identifier may be generated by hashing other inputs such as the contents of read-only memory (ROM), soft straps, programable regions, etc., that may not be considered 'firmware' but are part of the TCB 104 or root-of-trust. These values may be concatenated and hashed to produce a class identifier that is common for all devices that have the same root of trust or DICE layer. In an embodiment, in these cases the size of the current component may be set to one. In this way the process described herein nominally increases the cumulative size of the TCB 104 without changing the definition of the TCB size with respect to mutable code. In other embodiments, other cost schemes may be implemented that set sizes for immutable components at larger values without materially altering the processing described herein.

Figure 4:
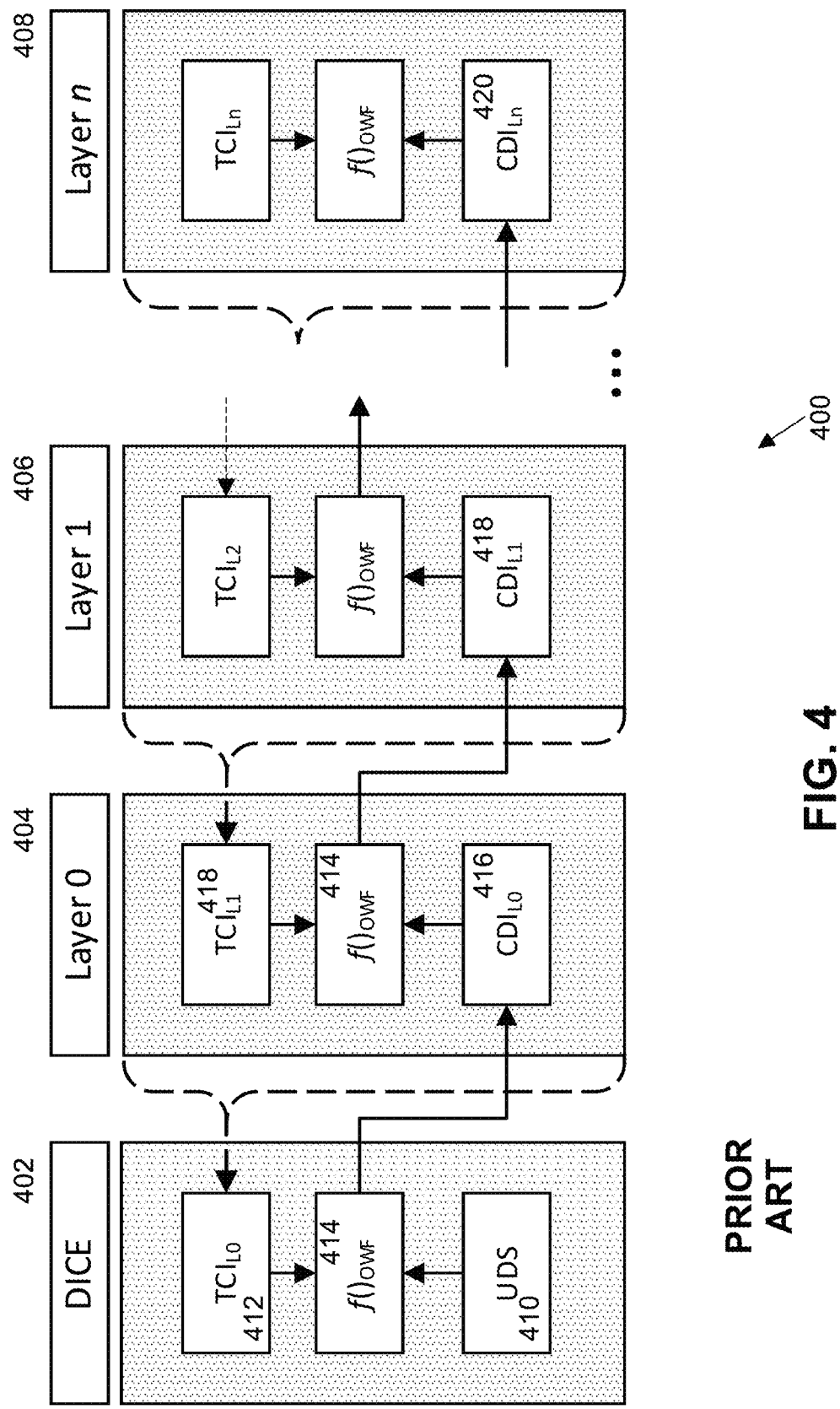
FIG. 4 is a prior art diagram of DICE layering.

FIG. 4 is a prior art diagram of DICE layering 400. There are n+2 layers represented in FIG. 4: DICE layer 402, layer 0 404, layer 1 406, ... layer n 408, where n is a natural number. DICE Layering Architecture uses a CDI to supply a value containing entropy that is unique to a layer. For example, layer 0 404 includes $CDI_{L0}$ 416 and layer n 408 includes $CDI_{Ln}$ 420. Entropy is derived from a root of trust value called a Unique Device Secret (UDS) 410, a device-specific, statistically unique value stored in fuses or other read-only storage in computing system 102. UDS 410 is included in DICE layer 402, along with an initial identifier $TCI_{L0}$ 412. UDS 410 and CDI values (such as $CDI_{L0}$ 416, $CDI_{L1}$ 418, ... $CDI_{Ln}$ 420) are secret values suitable for calculating a next layer CDI or generating cryptographic keys and seeds. Layers are permitted to inject additional entropy if an entropy source is available. One way function (f( )$_{OWF}$) 414 is included in each layer, taking as input the TCI of each layer (e.g., $TCI_{L0}$ 412, $TCI_{L1}$ 418, etc.) and CDI of each layer (e.g., $CDI_{L0}$ 416, $CDI_{L1}$ 418, ... $CDI_{Ln}$ 420).

Keys generated from a CDI attest to the layer implicitly when used to sign a challenge or other information because the key only exists when the TCB configuration matches the TCI value. This implicit attestation means that the verifier can conclude that if the attester was able to complete a signature using the attestation key then the attester must be in a secure state, otherwise, the key would be different and the attester couldn't create a signature that verifies using the public key trusted by the verifier. In other words, if the layer/configuration changes (and the verifier wasn't notified of the change) then the fact that the key pair changed is a way to force the verifier to be notified of an unexpected change.

Figure 5:
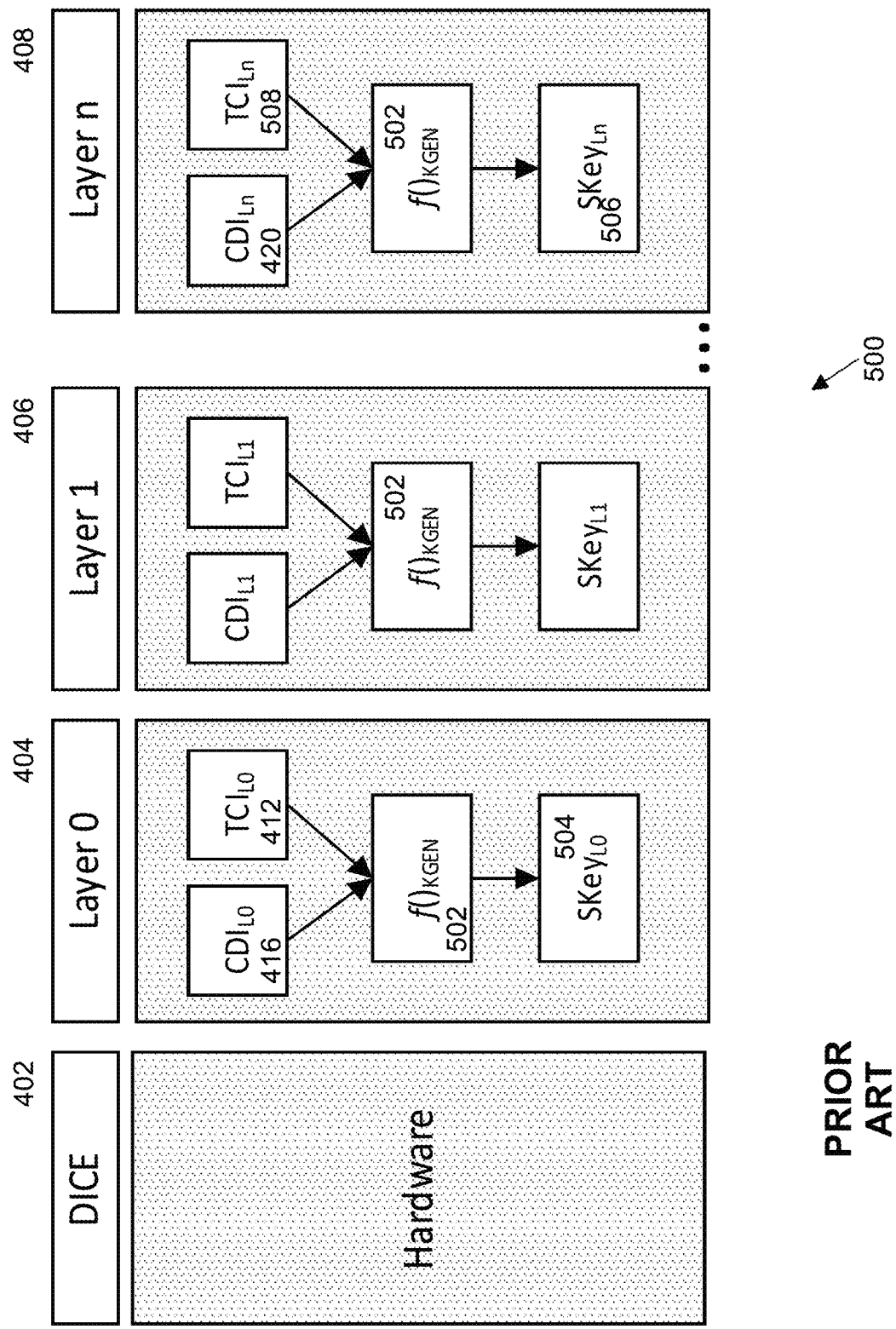
FIG. 5 is a prior art diagram of DICE key generation within a layer.

FIG. 5 is a prior art diagram of DICE key generation within a layer 500. $CDI_{L0}$ 416 is used along with initial identifier $TLI_{L0}$ 412 to generate a key $Skey_{L0}$ 504 by key generation function f( )$_{KGEN}$ 502 for layer 0 404. Similarly, CDIs and TCIs may be used to generate one or more keys for each layer (e.g., $CDI_{Ln}$ 420 and $TCI_{Ln}$ 508 to generate $Skey_{Ln}$ 506 for layer n 408). The key generation function f( )$_{KGEN}$ may be used to generate symmetric and asymmetric keys. Asymmetric key generation uses the CDI to seed a random number generator used to select primes for Rivest Shamir Adleman (RSA) implementations or to select curves for elliptic curve implementations. The CDI is used with a symmetric key generation function (e.g., key generation function f( )$_{KGEN}$ 502) to contribute entropy and uniqueness to the resulting key (e.g., $Skey_{L0}$ 504).

Figure 8:
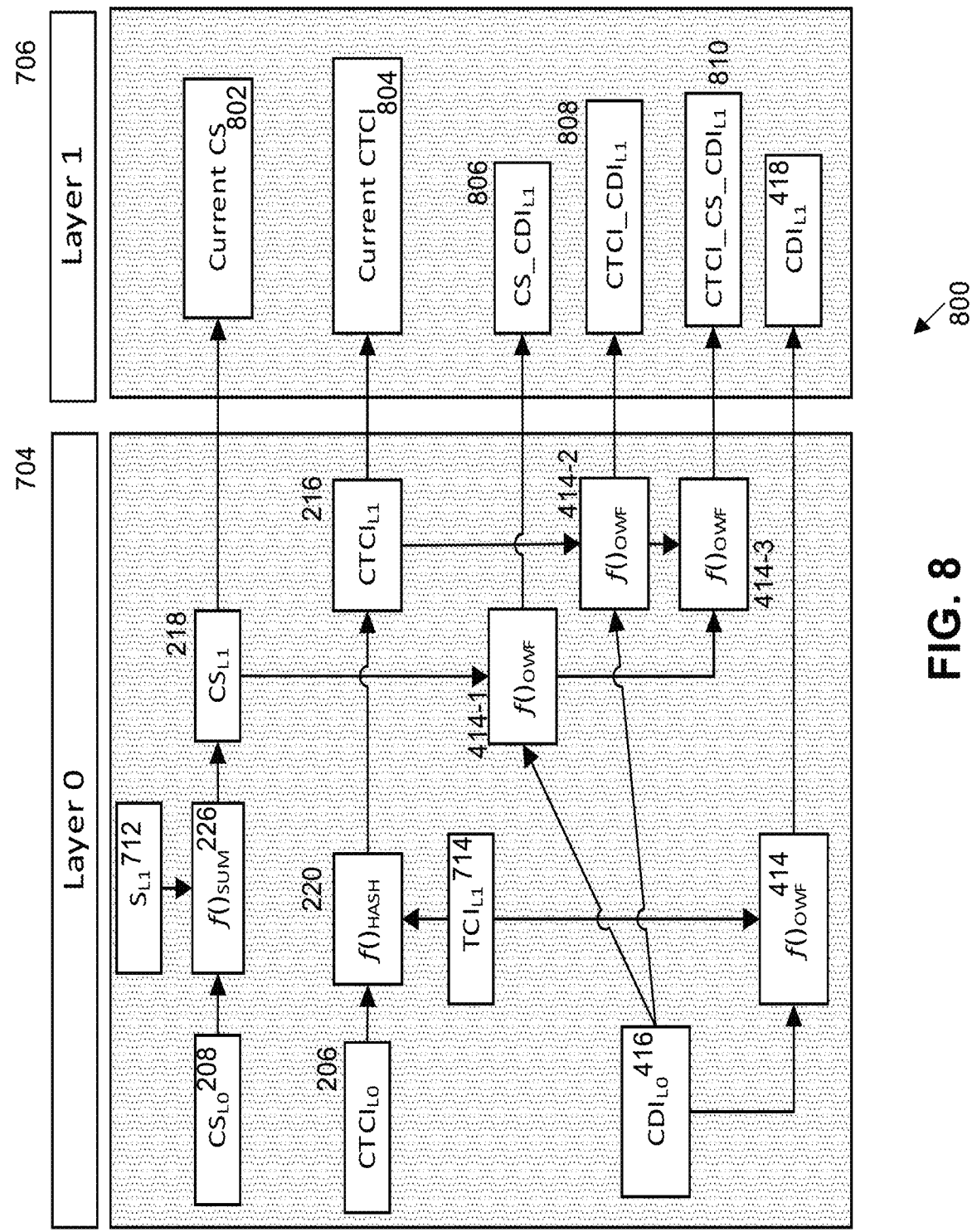
FIG. 8 is a diagram of a cumulative size and cumulative TCI of a TCB as a part of measurement generation according to some embodiments.

It should be understood that embodiments provide that any of the CDI computations described herein (as shown in FIGS. 2, 3 and 8) can be used in place of the CDI value as described in FIGS. 4 and 5.

Figure 6:
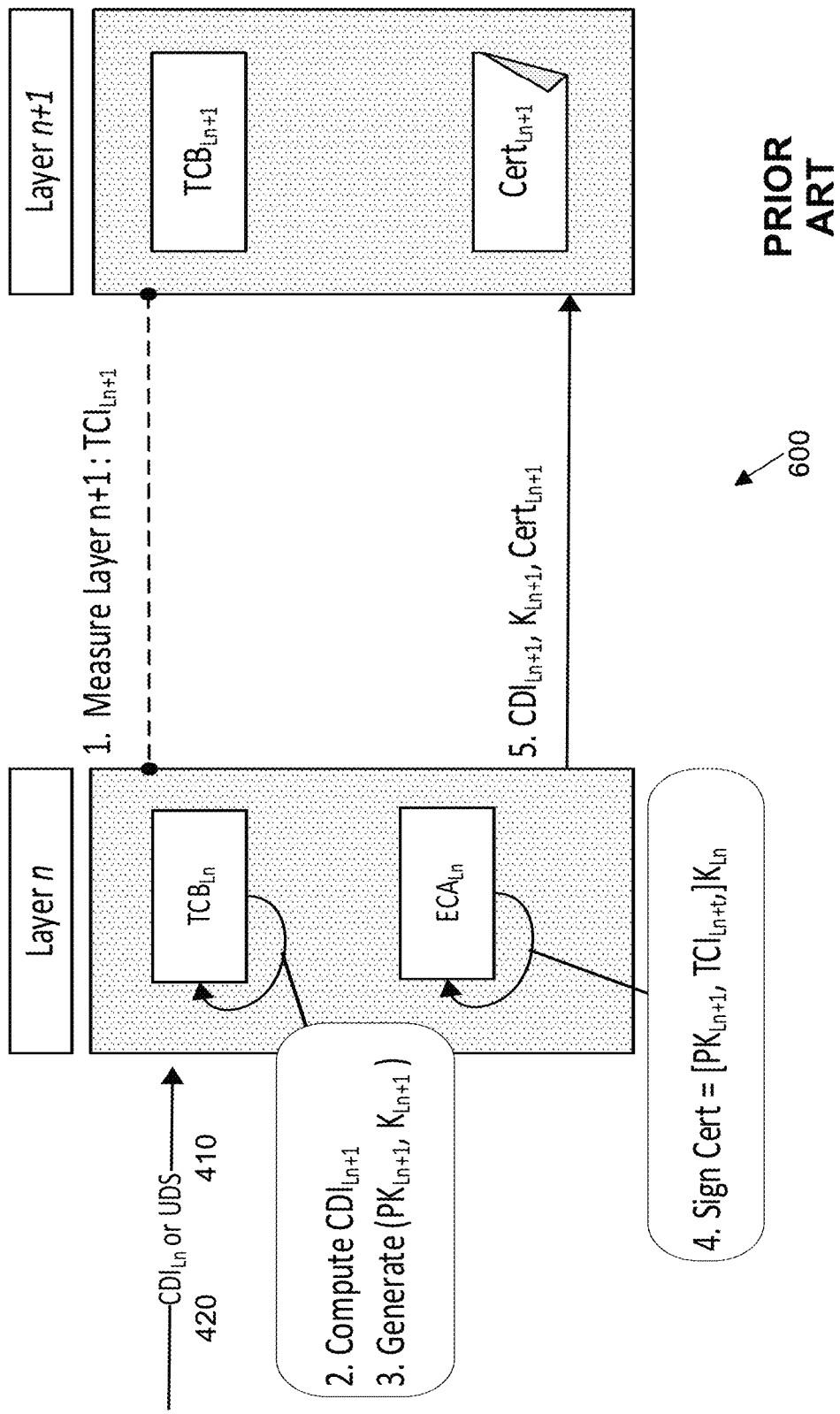
FIG. 6 is a prior art diagram of DICE embedded certificate authority (CA) certificate issuance.

FIG. 6 is a prior art diagram of DICE embedded certificate authority (CA) certificate issuance 600. The DICE layers can be used to issue certificates for layer specific asymmetric keys. The layer n asymmetric key signs a certificate containing a layer n+1 public key. The key enrollment/certificate signing request (CSR) flow is shown in FIG. 6.

Figure 7A:
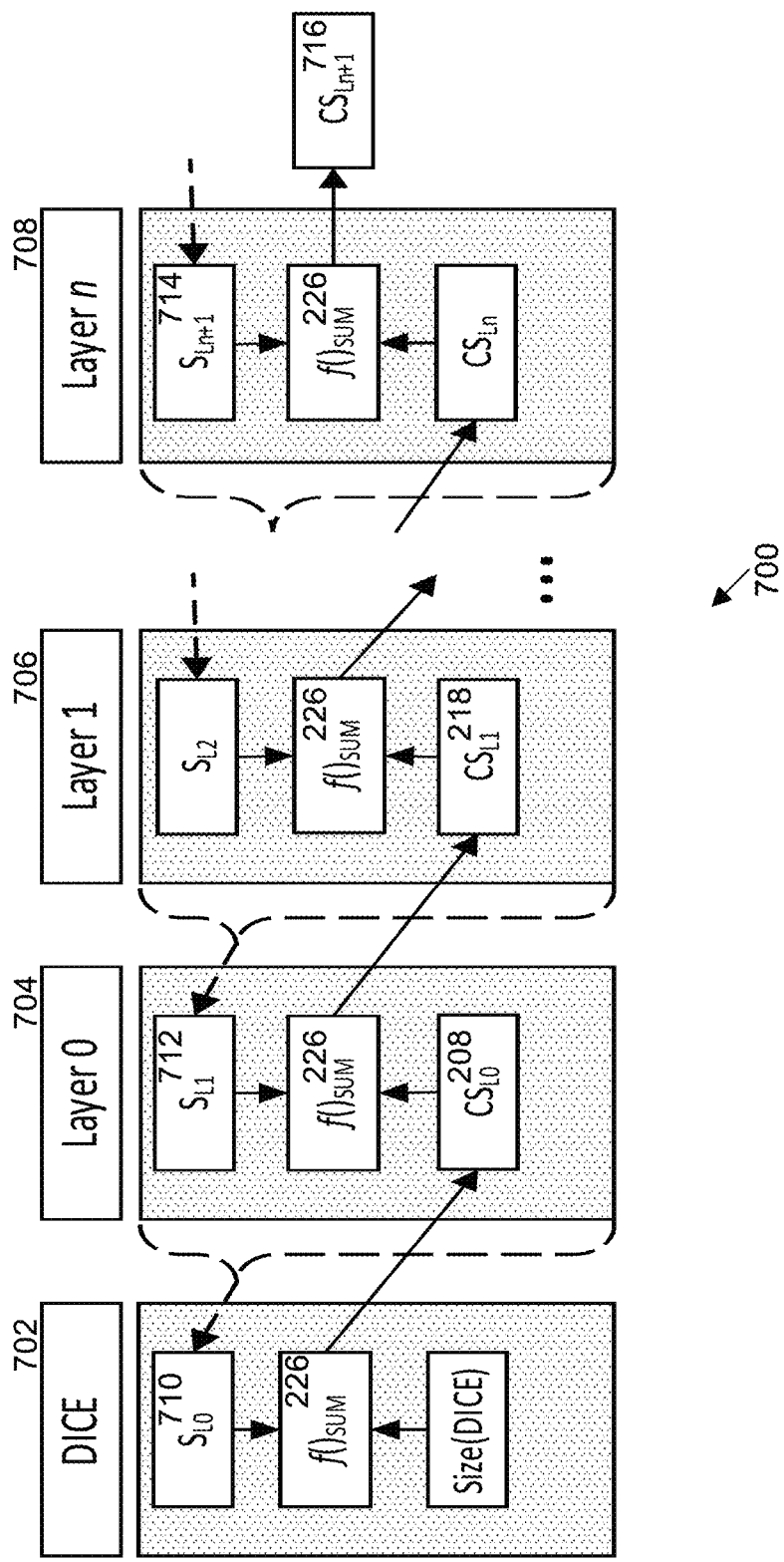
FIGS. 7A and 7B are diagrams of layering according to some embodiments.
Figure 7B:
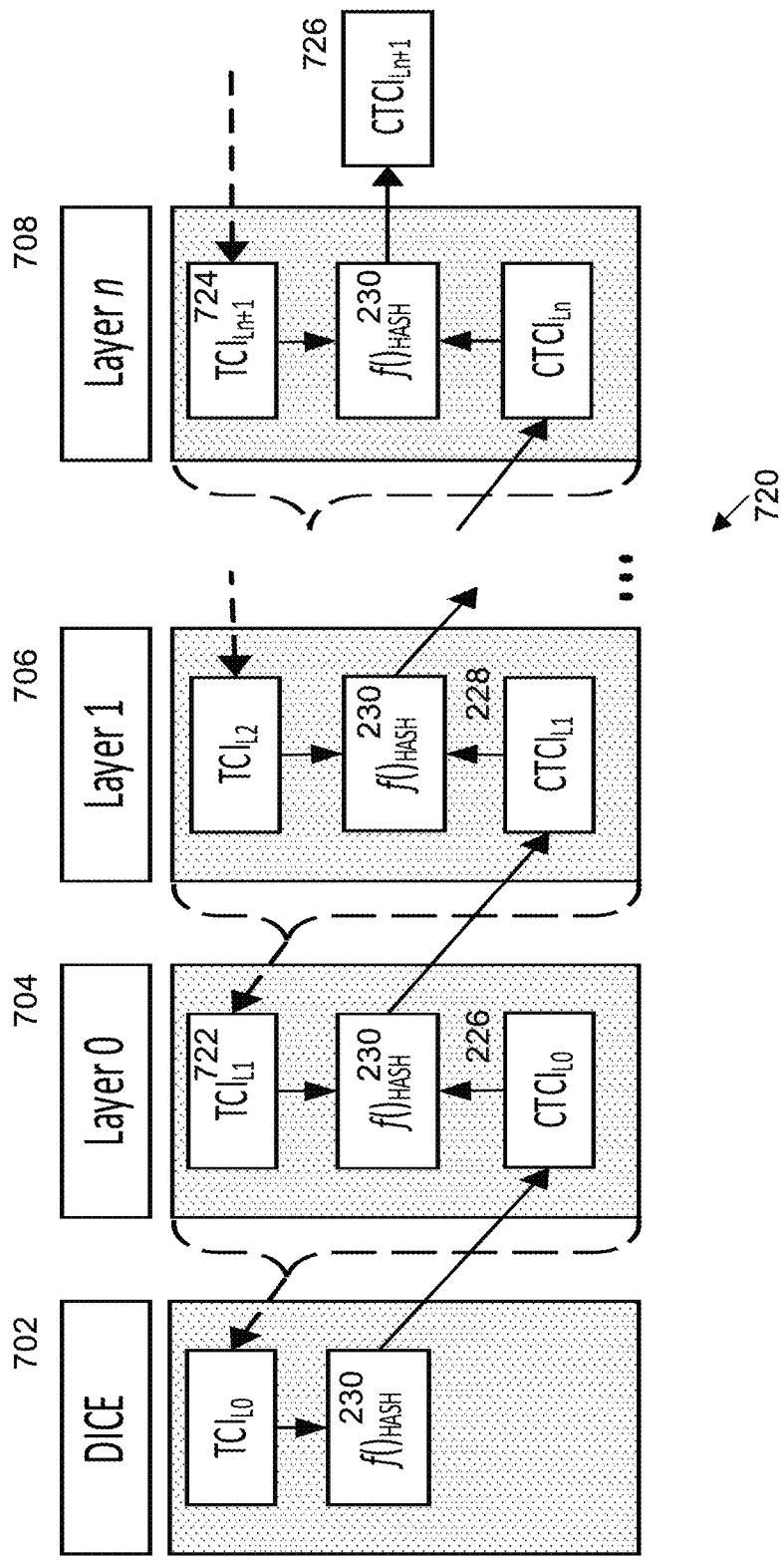

FIGS. 7A and 7B are diagrams of layering according to some embodiments. FIG. 7A is a diagram 700 of DICE layering with a cumulative size (CS) according to some embodiments. The technology described herein improves upon existing DICE layering by computing the size of the next layer as a measurement of complexity. There are n+2 layers represented in FIG. 7A: DICE layer 702, layer 0 704, layer 1 706, ... layer n 708, where n is a natural number. For example, for DICE layer 702, a complexity $S_{L0}$ 710 may be the size of layer 0 704, for layer 0 704, a complexity $S_{L1}$ 712 may be the size of layer 1 706, ... $S_{Ln+1}$ 714 may be the size of layer n+1. The complexity S for a current layer (e.g., $S_{L1}$ 712) is summed by f( )$_{SUM}$ 227 with the previous layer's cumulative size (e.g., $CS_{L0}$ 208) to form the cumulative size (CS) (e.g., $CS_{L1}$ 218) for the current layer. In this example, a final size $CS_{Ln+1}$ 716 may represent the size of the set of layers and the complexity $S_{Ln+1}$ 714 represents the cumulative complexity of all layers. Thus, $CS_{Ln+1}$ 716 is a measure of the complexity of the TCB. CS is the cumulative size of all the TCBs in the previous layers. The root of trust is included in the CS also so that size is an accurate depiction of components in computing system 102 that are trusted.

In other embodiments, other ways to calculate complexity (instead of the size of the binary code) may be used, such as interface complexity and structural complexity. In an embodiment, alternative complexity metrics can be incorporated by applying a function that calculates alternative complexity, such as counting the number of attributes and methods, counting the number of local methods, applying the McCabe Cyclomatic complexity formula, counting weighted methods, and counting class responses. All complexity functions return a complexity value S.

Complexity is a measure of trustworthiness. When the firmware digest (e.g., evidence 112) is supplied to a verifier, the verifier checks an allow/deny list to see if this evidence is on the list. Being on the list means there may be a vulnerability that could be exploited. The verifier uses this information to assess risk that the attester is potentially compromised because of the vulnerability. The process may also be applied to complexity. Rather than a known exploit being socialized, and the firmware being identified as having the exploit then being placed on the list, a complexity measurement may be used to assert that there could be a not-yet-discovered vulnerability that the verifier must evaluate risk based on the possibility that the undiscovered vulnerability exists in the attester and an exploit has been successful.

FIG. 7B is a diagram 720 of DICE layering according to some embodiments. The technology described herein improves upon existing DICE layering by computing a hash of a cumulative TCI of the current layer as a measurement of complexity. There are n+2 layers represented in FIG. 7B: DICE layer 702, layer 0 704, layer 1 706, . . . layer n 708, where n is a natural number. For example, for DICE layer 702, a $TCI_{L0}$ 720 may be the cumulative TCI of layer 0 704 and DICE layer 702, for layer 0 704, a $TCI_{L1}$ 722 may be the cumulative TCI of layer 1 706, . . . $TCI_{Ln+1}$ 724 may be the cumulative TCI of layer n+1. The cumulative TCI for a current layer (e.g., $TCI_{L1}$ 722) is hashed by $f()_{HASH}$ 230 with the previous layer's cumulative TCI (e.g., $CTCI_{L0}$ 226) to form the cumulative TCI (CTCI) (e.g., $CTCI_{L1}$ 728) for the current layer. In this example, a final CTCI ($CTCI_{Ln+1}$ 726) may represent the cumulative complexity of the set of layers. Thus, $CTCI_{Ln+1}$ 726 is a measure of the complexity of the TCB.

FIG. 8 is a diagram 800 of a cumulative size and cumulative TCI of a TCB as a part of DICE CDI generation according to some embodiments. In one embodiment, the cumulative size (CS) value (e.g., $CS_{L1}$ 218, also denoted as current cumulative size 802) can be combined (e.g., using combiner 240 of FIG. 2) with the CDI calculation $CDI_{L0}$ 416 using one-way function $f()_{OWF}$ 414-2 to form cumulative size CDI (e.g., $CS\_CDI_{L1}$ 806). In an embodiment, one-way function 414-1 is CMAC, a block-based cipher message authentication code (MAC) algorithm. The result of applying the one-way function 414-1 is $CS\_CDI_{L1}$ 806 that includes a size-based complexity metric. Attestation keys generated using the $CS\_CDI_{L1}$ value 806 can implicitly attest the complexity metric upon use (e.g., by signing). For example, step 2 of FIG. 6 may use CS_CDI instead of $CDI_{Ln+1}$ in the key generation process. If a complexity layer changes complexity a different key will be generated, and the previous complexity layer is no longer able to attest or perform other cryptographic operations.

In another embodiment, the current cumulative TCI (CTCI) value (e.g., $CTCI_{L1}$ 216, also denoted at current CTCI 804) can be combined (e.g., using combiner 240 of FIG. 2) with the CDI calculation $CDI_{L0}$ 416 using one-way function $f()_{OWF}$ 414-2 to form cumulative CTCI CDI (e.g., $CTCI\_CDI_{L1}$ 808). In an embodiment, one-way function $f()_{OWF}$ 414-2 is CMAC, a block-based cipher message authentication code (MAC) algorithm. The result of applying the one-way function $f()_{OWF}$ 414-2 is $CTCI\_CDI_{L1}$ 808 that includes a TCI-based complexity metric. Attestation keys generated using the $CTCI\_CDI_{L1}$ value can implicitly attest the complexity metric upon use (e.g., by signing). For example, step 2 of FIG. 6 may use CTCI_CDI instead of $CDI_{Ln+1}$ in the key generation process. If a complexity layer changes complexity a different key will be generated, and the previous complexity layer is no longer able to attest or perform other cryptographic operations.

In another embodiment, both CS and CTCI can be combined with CDI. Thus, $CS_{L1}$ 218 can be combined CDI L0 416 using $f()_{OWF}$ 414-1, $CTCI_{L1}$ 216 can be combined with CDI L0 416 using one-way function $f()_{OWF}$ 414-2, and the results of these two computations can be combined using $f()_{OWF}$ 414-3 to produce $CTCI\_CS\_CDI_{L1}$ 810. Attestation keys generated using the $CTCI\_CS\_CDI_{L1}$ 810 value can implicitly attest the complexity metric upon use (e.g., by signing). For example, step 2 of FIG. 6 may use CTCI_CS_CDI instead of $CDI_{Ln+1}$ in the key generation process. If a complexity layer changes complexity a different key will be generated, and the previous complexity layer is no longer able to attest or perform other cryptographic operations.

FIGS. 9A, 9B, 9C, and 9D are flow diagrams of measurement generation according to some embodiments. After start block 902 of FIG. 9A, at block 904 if TCI is not used, processing ends at block 906. If TCI is being used, then at block 908 measurement generator 106 generates a current TCI 214 of the current layer. At block 910, if CDI is used, then at block 912, measurement generator 106 generates a current CDI 216 of the current layer using a one-way function. At block 914, measurement generator 106 makes the current CDI 216 available for the current layer. Processing continues on FIG. 9B via connector 9B. If the CDI is not used at block 910, then processing continues via connector 9B.

Figure 9A:
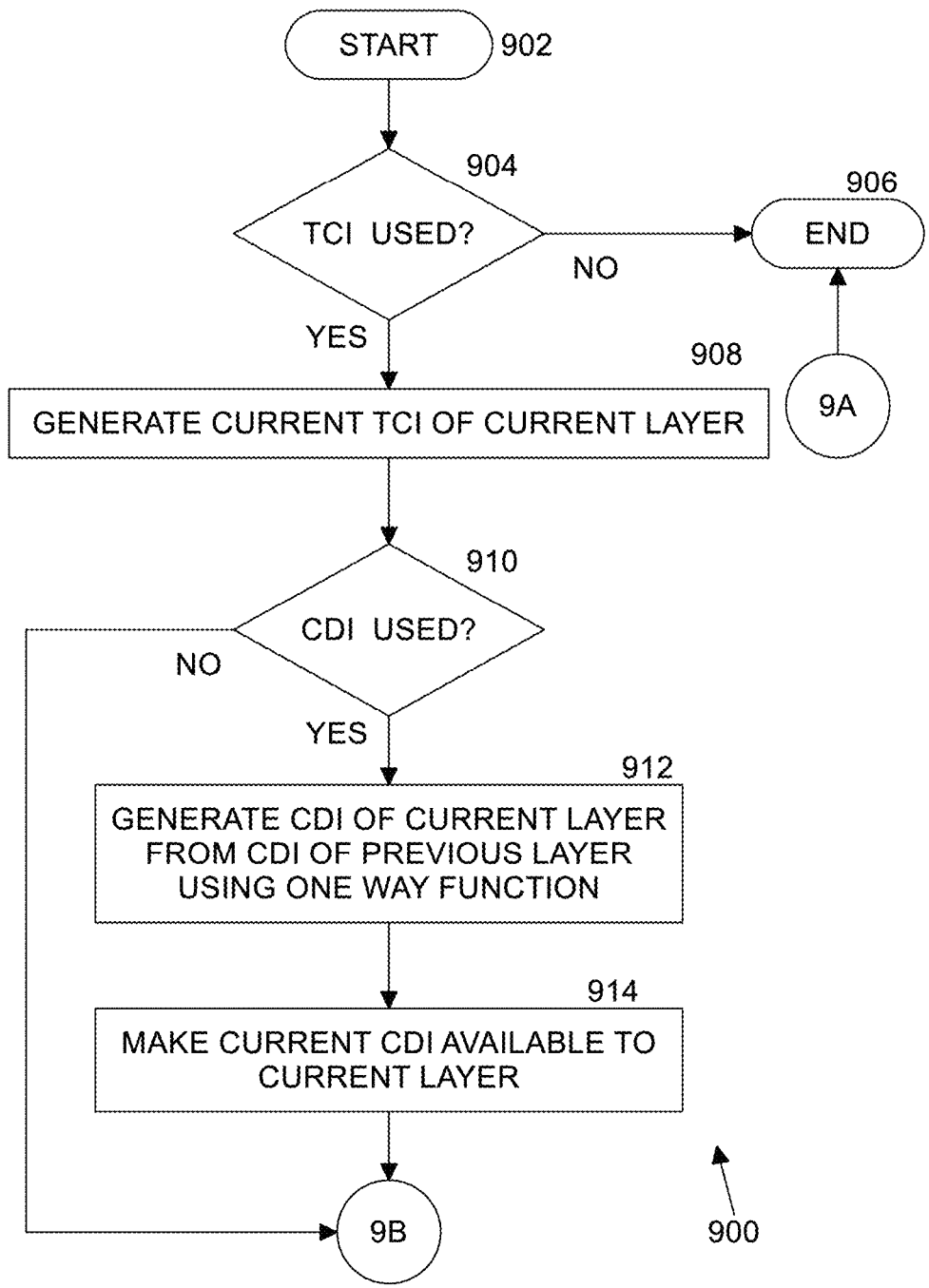
Figure 9B:
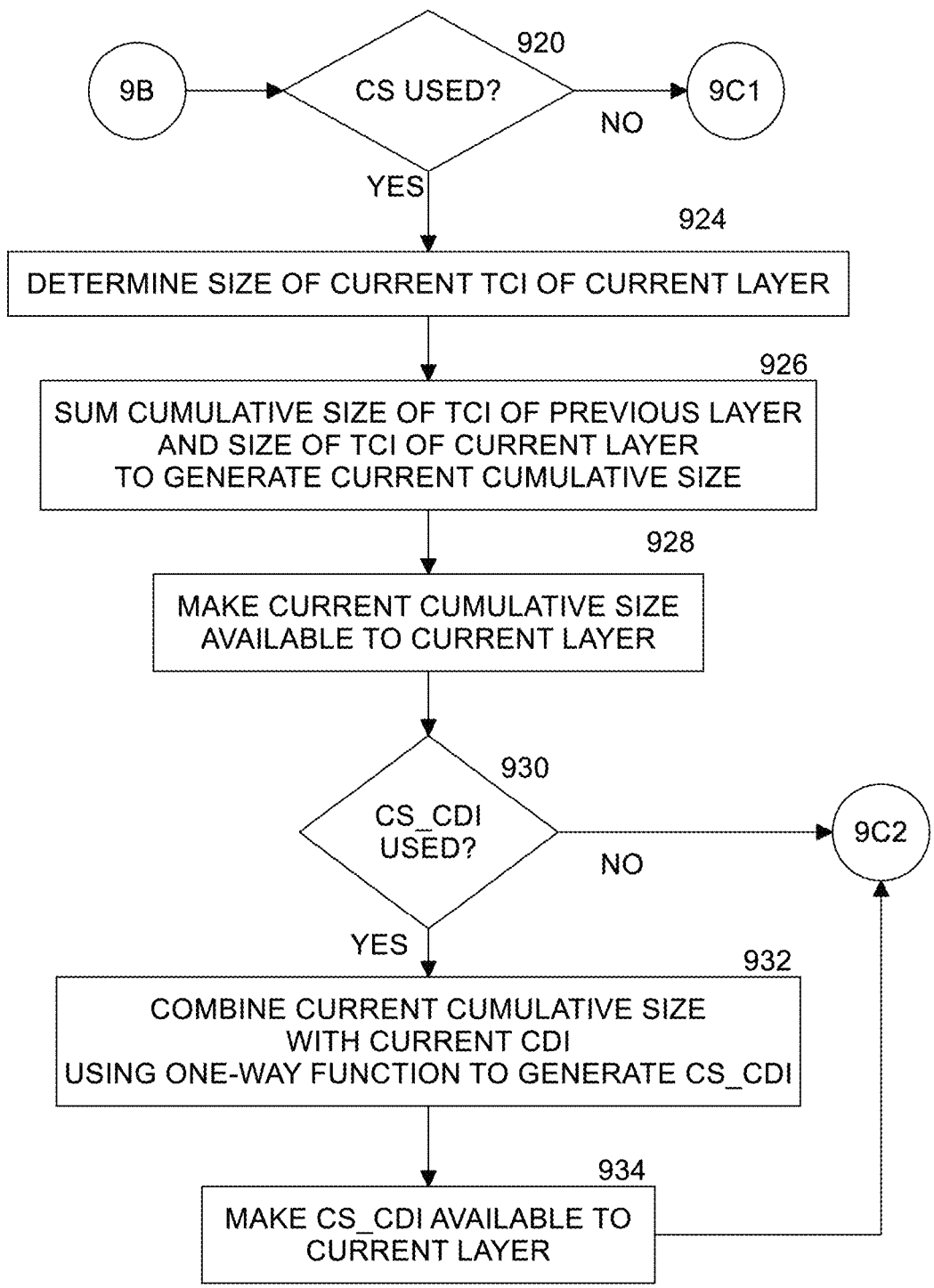

At block 920 of FIG. 9B, if the cumulative size (CS) is not used, then processing continues on FIG. 9C with block 960 via connector 9C1. If the cumulative size is used, then at block 924, measurement generator 106 determines the size of the current TCI 214 of the current layer. At block 926, measurement generator 106 sums the cumulative size 208 of the previous layer and the size of the current TCI to form the current cumulative size 802. At block 928, measurement generator 106 makes the current cumulative size 802 available to the current layer. At block 930, if the combination of cumulative size and CDI is used (CS_CDI), then at block 932, measurement generator 106 combines the current cumulative size and the current CDI using a one-way function to generate CS_CDI 806. At block 934, measurement generator 106 makes CS_CDI 806 available to the current layer. Processing continues at block 962 on FIG. 9C via connector 9C2. At block 930, if the CS_CDI is not used, processing continues at block 962 on FIG. 9C via connector 9C2.

At block 960 of FIG. 9C, if the combination of CTCI, CS, and CDI are not used, then processing continues with block 906 on FIG. 9A via connector 9A. If the combination of CTCI, CS, and CDI is used, then at block 962, measurement generator determines if CTCI is used. If not, processing continues with block 906 on FIG. 9A via connector 9A. If so, processing continues with block 964, where measurement generator 106 determines the current TCI 214 of the current layer. In an embodiment, if the current TCI of the current layer was determined at block 908, then this step may be omitted. At block 966, measurement generator 106 hashes the previous cumulative TCI 226 of the previous layer and the current TCI of the current layer to generate the current cumulative TCI 228 (CTCI) of the current layer. At block 968, measurement generator 106 makes the current cumulative TCI 228 of the current layer available to the current layer. At block 970, if the combination of CTCI and CDI is not used, processing continues with block 906 on FIG. 9A via connector 9A. If the combination of CTCI and CDI is used, then at block 972, measurement generator 106 combines the current cumulative TCI of the current layer with the current CDI of the current layer using a one-way function to generate CTCI_CDI 808. At block 974, the CTCI_CDI is made available to the current layer. Processing continues at block 980 on FIG. 9D via connector 9D.

Figure 9D:
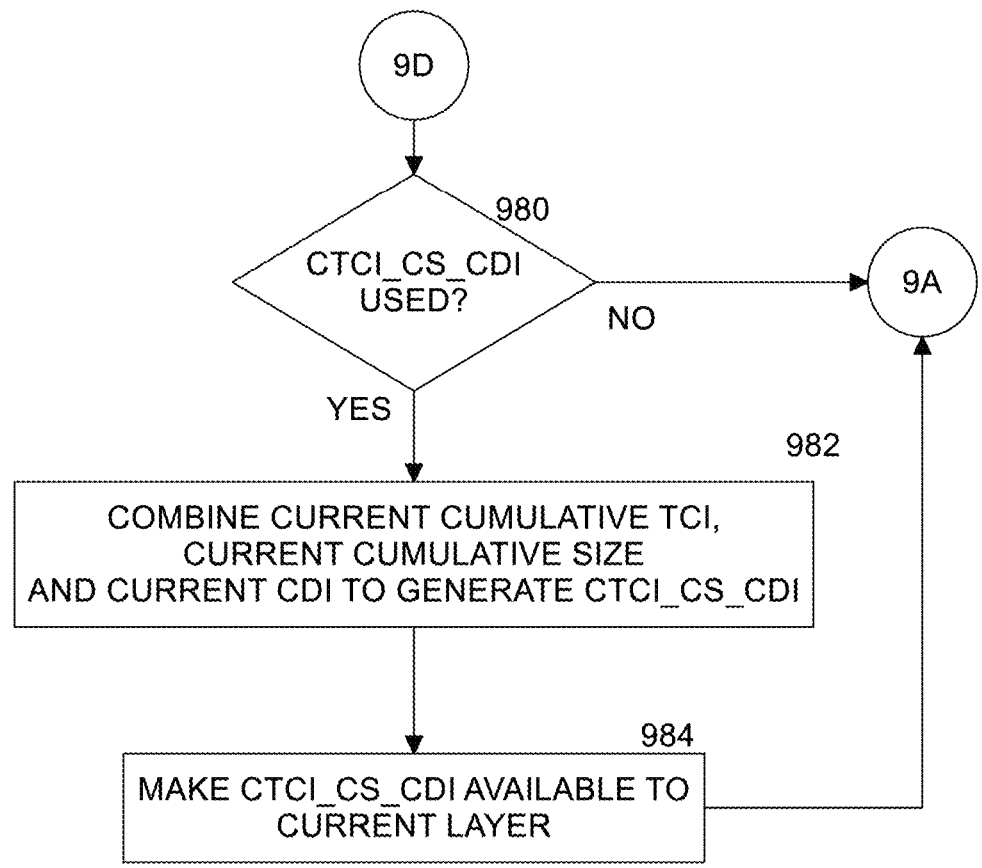

At block 980 of FIG. 9D, if the combination of CTCI and CS and CDI is not used, then processing continues with block 906 on FIG. 9A via connector 9A. If the combination of CTCI and CS and CDI is used, then at block 982, measurement generator 106 combines the current cumulative TCI 228 (CTCI), the current cumulative size 218 (CS) and the current CDI 216 to generate CTCI_CS_CDI. AT block 984, measurement generator 106 makes CTCI_CS_CDI available to the current layer. Processing continues with block 906 on FIG. 9A via connector 9A.

In an embodiment, a layer policy may be embedded in TCB 104 (e.g., an attester) by a manufacturer of computing system 102. In this case, the CS_CDI may be used by a class of customer for the computing system (such as a financial provider or a critical infrastructure provider) which may have particular security requirements.

In one scenario, the previous layer computes CDI values for the current layer and securely provisions the current layer with the CDI value. There are many possible ways to accomplish secure provisioning. In an embodiment, a "mailbox" including storage resource is created where the previous layer can write to the mailbox and the current layer can read from the mailbox. Once written, the previous layer can't open the mailbox to read (that is, re-read) and the current layer can't write a different value back into the mailbox.

Other information can be security provisioned using the mailbox approach including the CS and CS_CDI values. Additionally, a mailbox could be used to provision cryptographic keys that were generated using the CDI and CS_CDI values. This ensures that a compromised layer can't fake the legitimate key contained in the read-only mailbox. The compromised layer could generate a different key but couldn't reverse engineer a key that appears to have legitimate complexity properties and can't write an illegitimate key back into the mailbox to spoof legitimacy.

Figure 10:
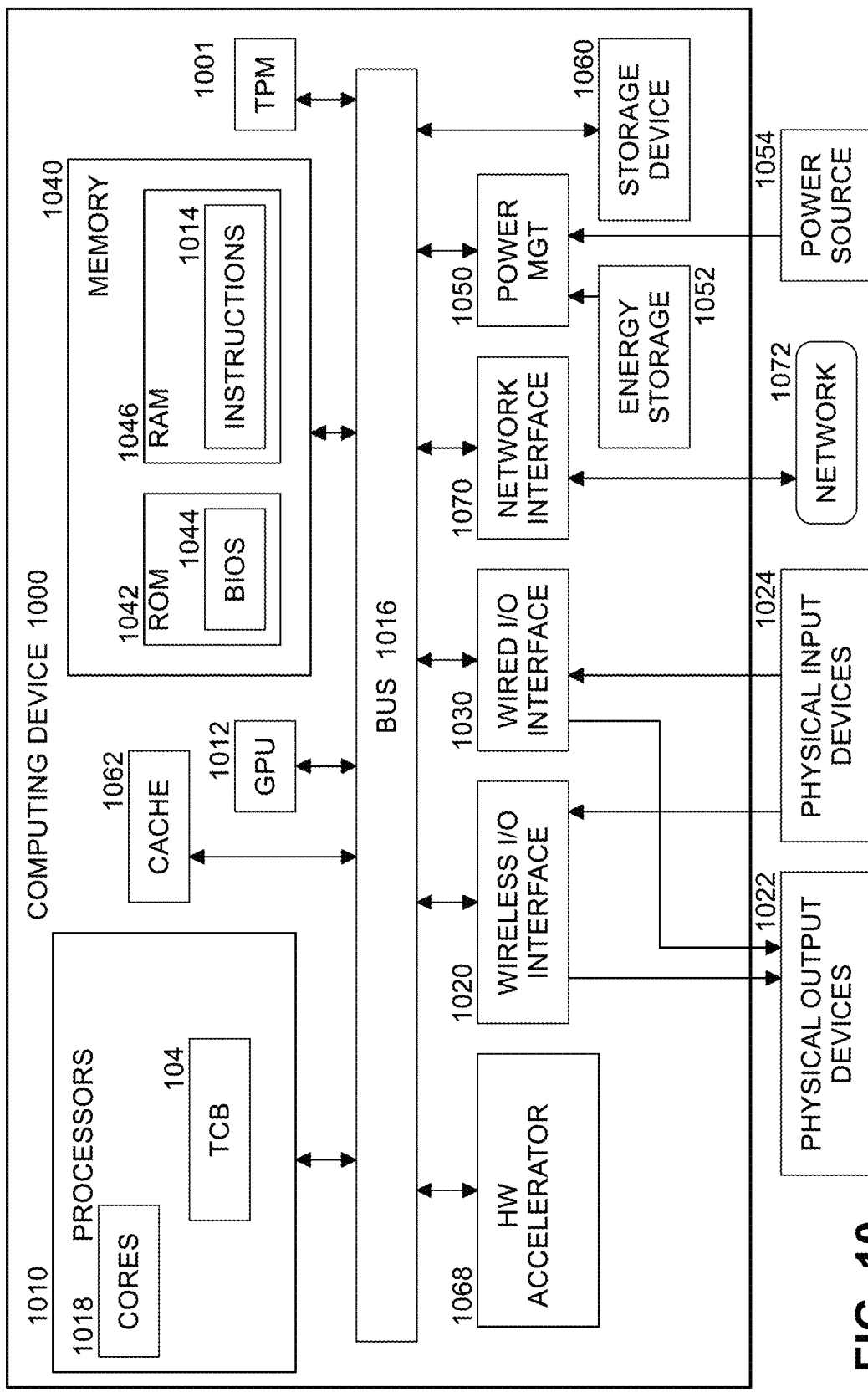
FIG. 10 is a schematic diagram of an illustrative electronic computing device to perform measurement generation processing according to some embodiments.

FIG. 10 is a schematic diagram of an illustrative electronic computing device to perform measurement processing according to some embodiments. In some embodiments, computing device 1000 includes one or more processors 1010 including one or more processors cores 1018, and TCB 104. In some embodiments, the computing device 1000 includes one or more hardware accelerators 1068. Computing device 1000 includes trusted platform module (TPM) 1001.

In some embodiments, computing device 1000 is to implement trusted computing processing, as provided in FIGS. 1-9 above.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, memory circuitry 1040, power management circuitry 1050, non-transitory storage device 1060, and a network interface 1070 for connection to a network 1072. The following discussion provides a brief, general description of the components forming the computing device 1000. Example, non-limiting computing device 1000 may include a desktop computing device, blade server device, workstation, laptop computer, mobile phone, tablet computer, personal digital assistant, server, disaggregated server, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 1014 may include instructions to implement trusted computing processing, as provided in FIGS. 1-9.

The processor cores 1018 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 1000 includes a bus 1016 or similar communications link that communicably couples and facilitates the exchange of information and/or data between various system components including the processor cores 1018, the cache 1062, the graphics processing unit (GPU) circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 1000, since in certain embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks need not be described in further detail herein, as they will be understood by those skilled in the relevant art. The bus 1016 that interconnects at least some of the components of the computing device 1000 may employ any currently available or future developed serial or parallel bus structures or architectures.

The memory circuitry 1040 may include read-only memory ("ROM") 1042 and random-access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include but are not limited to universal serial bus (USB), IEEE 1394 ("Fire-Wire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processing unit circuitry 1012 and/or one or more applications executed on or by the processor cores 1018 and/or graphics processing unit circuitry 1012. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or Wi-Fi®, etc.).

Processor-readable instruction sets 1014 and other programs, applications, logic sets, and/or modules may be stored in whole or in part in the memory circuitry 1040. Such instruction sets 1014 may be transferred, in whole or in part, from the one or more data storage devices 1060. The instruction sets 1014 may be loaded, stored, or otherwise retained in memory circuitry 1040, in whole or in part, during execution by the processor cores 1018 and/or graphics processing unit circuitry 1012.

The computing device 1000 may include power management circuitry 10100 that controls one or more operational aspects of the energy storage device 10102. In embodiments, the energy storage device 10102 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processing unit circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

Flowcharts representative of example hardware logic, machine readable instructions, hardware implemented state machines, and/or any combination thereof for implementing computing device 1000, for example, are shown in FIGS. 3 and 9. The machine-readable instructions may be one or more executable programs or portion(s) of an executable program for execution by a computer processor such as the processor 1010 shown in the example computing device 1000 discussed above in connection with FIG. 10. The program may be embodied in software stored on a non-transitory computer readable storage medium such as a CD-ROM, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowcharts illustrated in FIGS. 3 and 9, many other methods of implementing the example computing device 1000 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and 9 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is a computing system including a processor; and a memory coupled to the processor, the memory having instructions stored thereon that, in response to execution by the processor, cause the processor to generate a trusted computing base (TCB) component identifier (TCI) of a current component of the computing system; generate a compound device identifier (ID) (CDI) of the current component from a CDI of a previous component of the computing system and the TCI of the current component; determine a size of the TCI of the current component; sum the size of the TCI of the current component and sizes of the TCIs of previous components of the computing system to generate a current cumulative size; combine the current cumulative size and the CDI of the current component; and include the combined current cumulative size and the CDI of the current component in a chain of measurements for attestation of the computing system.

In Example 2, the subject matter of Example 1 can optionally include wherein a trusted computing base (TCB) of the computing system includes the current component and the previous components.

In Example 3, the subject matter of Example 2 can optionally include wherein the TCI of the current component is in binary form and the size is measured in bytes.

In Example 4, the subject matter of Example 1 can optionally include instructions, when executed, to send the chain of measurements to a verifier to attest to trust of the computing system.

In Example 5, the subject matter of Example 1 can optionally include further comprising instructions, when executed, to hash a concatenation of a cumulative TCI of the previous component and the TCI of the current component to generate a current cumulative TCI of the current component; combine the current cumulative TCI of the current component and CDI of the current component; and include the combined current cumulative TCI of the current component and the CDI of the current component in the chain of measurements for attestation of the computing system.

In Example 6, the subject matter of Example 1 can optionally include further comprising instructions, when executed, to combine the current cumulative TCI of the current component, the current cumulative size, and the CDI of the current component; and include the current cumulative TCI of the current component, the current cumulative size, and the CDI of the current component in the chain of measurements for attestation of the computing system.

In Example 7, the subject matter of Example 1 can optionally include wherein the current cumulative size is a measurement of complexity of the current component and all previous components.

In Example 8, the subject matter of Example 1 can optionally include wherein the current cumulative TCI is a measurement of complexity of the current component and all previous components.

Example 9 is a method including generating a trusted computing base (TCB) component identifier (TCI) of a current component of a computing system; generating a compound device identifier (ID) (CDI) of the current component from a CDI of a previous component of the computing system and the TCI of the current component; determining a size of the TCI of the current component; summing the size of the TCI of the current component and sizes of the TCIs of previous components of the computing system to generate a current cumulative size; combining the current cumulative size and the CDI of the current component; and including the combined current cumulative size and the CDI of the current component in a chain of measurements for attestation of the computing system.

In Example 10, the subject matter of Example 9 can optionally include wherein a trusted computing base (TCB) of the computing system includes the current component and the previous components.

In Example 11, the subject matter of Example 9 can optionally include wherein the TCI of the current component is in binary form and the size is measured in bytes.

In Example 12, the subject matter of Example 9 can optionally include sending the chain of measurements to a verifier to attest to trust of the computing system.

In Example 13, the subject matter of Example 9 can optionally include hashing a concatenation of a cumulative TCI of the previous component and the TCI of the current component to generate a current cumulative TCI of the current component; combining the current cumulative TCI of the current component and CDI of the current component; and including the combined current cumulative TCI of the current component and the CDI of the current component in the chain of measurements for attestation of the computing system.

In Example 14, the subject matter of Example 13 can optionally include combining the current cumulative TCI of the current component, the current cumulative size, and the CDI of the current component; and including the current cumulative TCI of the current component, the current cumulative size, and the CDI of the current component in the chain of measurements for attestation of the computing system.

In Example 15, the subject matter of Example 9 can optionally include wherein the current cumulative size is a measurement of complexity of the current component and all previous components.

In Example 16, the subject matter of Example 15 can optionally include wherein the current cumulative TCI is a measurement of complexity of the current component and all previous components.

Example 17 is at least one non-transitory machine-readable storage medium comprising instructions that, when executed, cause at least one processing device to at least generate a trusted computing base (TCB) component identifier (TCI) of a current component of a computing system; generate a compound device identifier (ID) (CDI) of the current component from a CDI of a previous component of the computing system and the TCI of the current component; determine a size of the TCI of the current component; sum the size of the TCI of the current component and sizes of the TCIs of previous components of the computing system to generate a current cumulative size; combine the current cumulative size and the CDI of the current component; and include the combined current cumulative size and the CDI of the current component in a chain of measurements for attestation of the computing system.

In Example 18, the subject matter of Example 17 can optionally include instructions that, when executed, cause at least one processing device to send the chain of measurements to a verifier to attest to trust of the computing system.

In Example 19, the subject matter of Example 17 can optionally include instructions that, when executed, cause at least one processing device to hash a concatenation of a cumulative TCI of the previous component and the TCI of the current component to generate a current cumulative TCI of the current component; combine the current cumulative TCI of the current component and CDI of the current component; and include the combined current cumulative TCI of the current component and the CDI of the current component in the chain of measurements for attestation of the computing system.

In Example 20, the subject matter of Example 17 can optionally include instructions that, when executed, cause at least one processing device to combine the current cumulative TCI of the current component, the current cumulative size, and the CDI of the current component; and include the current cumulative TCI of the current component, the current cumulative size, and the CDI of the current component in the chain of measurements for attestation of the computing system.

Example 21 is a computing system including means for generating a trusted computing base (TCB) component identifier (TCI) of a current component of a computing system; means for generating a compound device identifier (ID) (CDI) of the current component from a CDI of a previous component of the computing system and the TCI of the current component; means for determining a size of the TCI of the current component; summing the size of the TCI of the current component and the cumulative size of the TCIs of previous components of the computing system to generate a current cumulative size; means for combining the current cumulative size and the CDI of the current component; and means for including the combined current cumulative size and the CDI of the current component in a chain of measurements for attestation of the computing system.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
a processor; and
a memory coupled to the processor, the memory having instructions stored thereon that, in response to execution by the processor, cause the processor to:
generate a trusted computing base (TCB) component identifier (TCI) of a current component of the computing system;
generate a compound device identifier (ID) (CDI) of the current component from a CDI of a previous component of the computing system and the TCI of the current component;
determine a size of the TCI of the current component;
sum the size of the TCI of the current component and sizes of the TCIs of previous components of the computing system to generate a current cumulative size;
combine the current cumulative size and the CDI of the current component; and
include the combined current cumulative size and the CDI of the current component in a chain of measurements for attestation of the computing system.

2. The apparatus of claim 1, wherein a trusted computing base (TCB) of the computing system includes the current component and the previous components.

3. The apparatus of claim 1, wherein the TCI of the current component is in binary form and the size is measured in bytes.

4. The apparatus of claim 1, further comprising instructions, when executed, to send the chain of measurements to a verifier to attest to trust of the computing system.

5. The apparatus of claim 1, further comprising instructions, when executed, to:
hash a concatenation of a cumulative TCI of the previous component and the TCI of the current component to generate a current cumulative TCI of the current component;
combine the current cumulative TCI of the current component and CDI of the current component; and
include the combined current cumulative TCI of the current component and the CDI of the current component in the chain of measurements for attestation of the computing system.

6. The apparatus of claim 5, further comprising instructions, when executed, to:
combine the current cumulative TCI of the current component, the current cumulative size, and the CDI of the current component; and
include the current cumulative TCI of the current component, the current cumulative size, and the CDI of the current component in the chain of measurements for attestation of the computing system.

7. The apparatus of claim 5, wherein the current cumulative TCI is a measurement of complexity of the current component and all previous components.

8. The apparatus of claim 1, wherein the current cumulative size is a measurement of complexity of the current component and all previous components.

9. A method comprising:
generating a trusted computing base (TCB) component identifier (TCI) of a current component of a computing system;
generating a compound device identifier (ID) (CDI) of the current component from a CDI of a previous component of the computing system and the TCI of the current component;
determining a size of the TCI of the current component;
summing the size of the TCI of the current component and sizes of the TCIs of previous components of the computing system to generate a current cumulative size;
combining the current cumulative size and the CDI of the current component; and
including the combined current cumulative size and the CDI of the current component in a chain of measurements for attestation of the computing system.

10. The method of claim 9, wherein a trusted computing base (TCB) of the computing system includes the current component and the previous components.

11. The method of claim 9, wherein the TCI of the current component is in binary form and the size is measured in bytes.

12. The method of claim 9, comprising sending the chain of measurements to a verifier to attest to trust of the computing system.

13. The method of claim 9, comprising:
hashing a concatenation of a cumulative TCI of the previous component and the TCI of the current component to generate a current cumulative TCI of the current component;
combining the current cumulative TCI of the current component and CDI of the current component; and
including the combined current cumulative TCI of the current component and the CDI of the current component in the chain of measurements for attestation of the computing system.

14. The method of claim 13, comprising:
combining the current cumulative TCI of the current component, the current cumulative size, and the CDI of the current component; and
including the current cumulative TCI of the current component, the current cumulative size, and the CDI of the current component in the chain of measurements for attestation of the computing system.

15. The method of claim 13, wherein the current cumulative TCI is a measurement of complexity of the current component and all previous components.

16. The method of claim 9, wherein the current cumulative size is a measurement of complexity of the current component and all previous components.

17. At least one non-transitory machine-readable storage medium comprising instructions that, when executed, cause at least one processing device to at least:

generate a trusted computing base (TCB) component identifier (TCI) of a current component of a computing system;

generate a compound device identifier (ID) (CDI) of the current component from a CDI of a previous component of the computing system and the TCI of the current component;

determine a size of the TCI of the current component;

sum the size of the TCI of the current component and sizes of the TCIs of previous components of the computing system to generate a current cumulative size;

combine the current cumulative size and the CDI of the current component; and include the combined current cumulative size and the CDI of the current component in a chain of measurements for attestation of the computing system.

18. The at least one non-transitory machine-readable storage medium of claim 17, comprising instructions that, when executed, cause at least one processing device to send the chain of measurements to a verifier to attest to trust of the computing system.

19. The at least one non-transitory machine-readable storage medium of claim 17, comprising instructions that, when executed, cause at least one processing device to:

hash a concatenation of a cumulative TCI of the previous component and the TCI of the current component to generate a current cumulative TCI of the current component;

combine the current cumulative TCI of the current component and CDI of the current component; and include the combined current cumulative TCI of the current component and the CDI of the current component in the chain of measurements for attestation of the computing system.

20. The at least one non-transitory machine-readable storage medium of claim 17, comprising instructions that, when executed, cause at least one processing device to:

combine the current cumulative TCI of the current component, the current cumulative size, and the CDI of the current component; and include the current cumulative TCI of the current component, the current cumulative size, and the CDI of the current component in the chain of measurements for attestation of the computing system.

* * * * *